United States Patent [19]

Bendrell

[11] Patent Number: 5,557,895
[45] Date of Patent: Sep. 24, 1996

[54] DETACHABLE BRACKET FORMING A WALL BOTTOM SKIRTING FOR FIXING CONNECTIONS

[76] Inventor: Jean-Claude Bendrell, 263 Cours de la Somme, 33800 Bordeaux, France

[21] Appl. No.: 313,228

[22] PCT Filed: Apr. 6, 1993

[86] PCT No.: PCT/FR93/00345

§ 371 Date: Dec. 21, 1994

§ 102(e) Date: Dec. 21, 1994

[87] PCT Pub. No.: WO93/20607

PCT Pub. Date: Oct. 14, 1993

[30] Foreign Application Priority Data

Apr. 7, 1992 [FR] France .................................. 92 04471

[51] Int. Cl.⁶ ............................................................ E04B 2/00
[52] U.S. Cl. ........................ 52/220.7; 52/787.1; 52/288.1; 52/718.02; 52/718.05; 52/718.06
[58] Field of Search .............................. 52/287.1, 288.1, 52/220.7, 718.03, 718.04, 718.06, 273, 717.03, 717.04, 718.05, 718.06, 718.02

[56] References Cited

U.S. PATENT DOCUMENTS

| 1,936,507 | 11/1933 | Green | 52/287.1 |
| 2,132,400 | 10/1938 | Curren | 52/717.06 X |
| 3,228,160 | 1/1966 | O'Brien | 52/287.1 X |
| 3,344,569 | 10/1967 | Cotten | 52/287.1 |
| 4,319,528 | 3/1982 | Gutridge et al. | 52/288.1 X |
| 5,243,800 | 9/1993 | Olbrich | 52/287.1 |

FOREIGN PATENT DOCUMENTS

| 7215374 | 2/1976 | Australia . | |
| 1539143 | 9/1968 | France . | |
| 2225858 | 11/1974 | France . | |
| 2266342 | 10/1975 | France . | |
| 2555371 | 5/1985 | France . | |
| 2588425 | 4/1987 | France . | |
| 1659425 | 4/1970 | Germany | 52/718.04 |

Primary Examiner—Carl D. Friedman
Assistant Examiner—Christopher Todd Kent
Attorney, Agent, or Firm—Pearne, Gordon, McCoy & Granger

[57] ABSTRACT

The invention relates to a detachable bracket forming a wall bottom skirting permitting the fixing of electrical and/or fluid connections and the concealment of cables and ducts associated with the connections. The bracket (1,2,3) is shaped like a stretched or drawn out Z which is vertically positioned and contacted at three points in a cavity (5) formed in the lower part of the wall (6), an abutment point (7) in the upper part of the upper flange (2) of the Z, a support point (8) in the upper part of the lower flange (3) of the Z and a fixing point (9) in the lower part of the lower flange. The connections are fixed to the median flange (1) of the stretched Z.

8 Claims, 2 Drawing Sheets

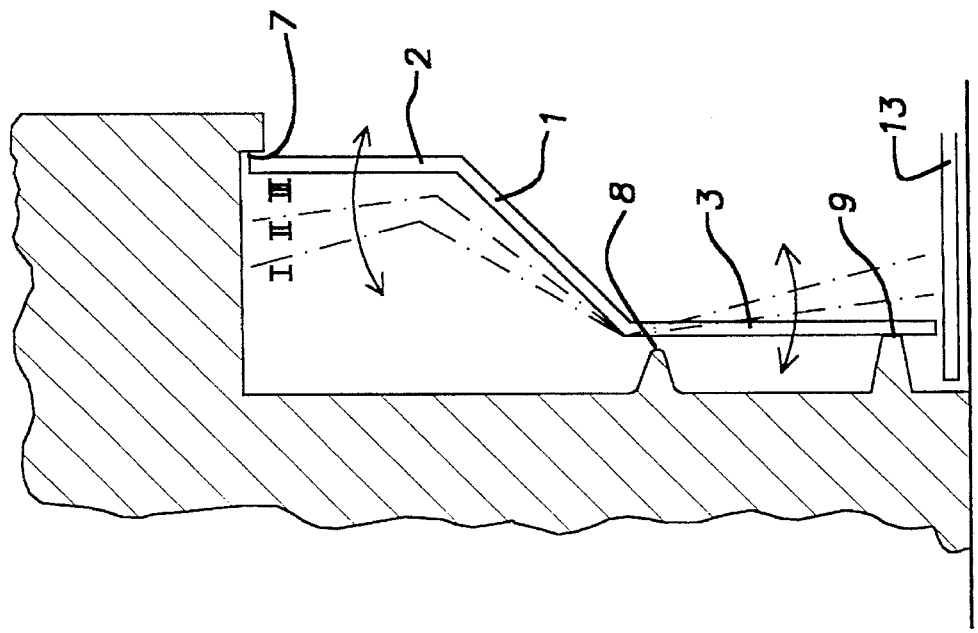
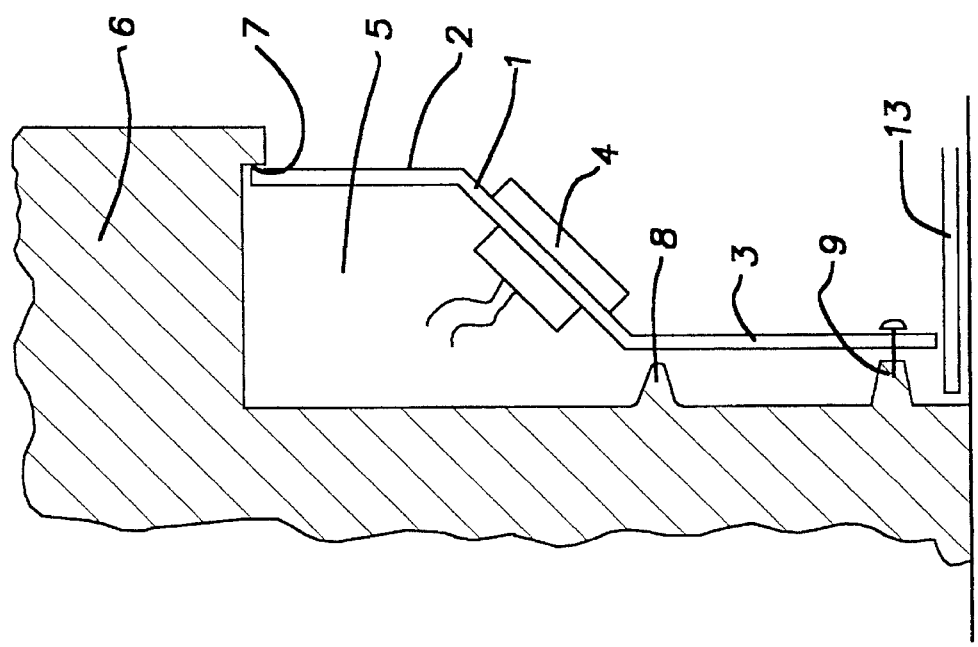

DETACHABLE BRACKET FORMING A WALL BOTTOM SKIRTING FOR FIXING CONNECTIONS

BACKGROUND OF THE INVENTION

The present invention relates to a detachable bracket forming a wall bottom skirting permitting the fixing of electrical and/or fluid connections and the concealment of the cables and ducts associated with said connections.

The interest of such skirtings is widely recognized, because they make it possible to place various electrical and/or fluid connections at the bottom of the wall, said connections being accessible from the rear. In addition, the cables and connections are concealed so as to provide an aesthetically satisfactory assembly.

These skirtings or brackets must have an adequate mechanical strength to withstand the transverse stresses produced by the installation and pulling out of the connectors. The fixing of these wall bottom skirtings must be able to withstand transverse stresses, but must still permit the easy assembly and disassembly thereof in order to give access to the rear of the connections for the purpose of carrying out connections between cables and/or ducts or for repair and maintenance interventions. It is also advantageous to install these skirtings and carry out the connections in the final construction phase, particularly after covering the floor.

The manufacture of such skirtings or brackets must be brought about by using materials of a non-onerous nature and in particular plastics materials, which are able to combine aesthetic and electrical insulation requirements.

Various bracket or skirting types are known making certain compromises between some of the aims indicated hereinbefore.

In this field reference is made to a compact wall bottom skirting (French Patent 2,225,858), whose covering section is equipped with electrical conductors placed in longitudinal channels. The positioning of this section is vertically regulatable.

Another type of skirting (French Patent 2,266,342) aims at obviating the fundamental disadvantage of the impossibility of fitting after laying the floor covering by using height-regulatable retaining and fixing means.

According to a different concept making use of superimposed shielded conduits having rectangular sections (French Patent 2,588,425), whose front and upper face covers permit the fixing of connectors, it is possible to directly energize apparatuses placed above the said conduits forming the skirting.

Improvements have been made to the various existing skirting types, particularly with respect to their mechanical resistance to the transverse stresses produced by the installation or pulling out of an electrical connector (French Patent 2,555,371) by constructing boxes forming superimposable cabinet units, whose front face cover is provided with slits giving access to conductor rails.

However, all these cabinet units, boxes, shielded conduits and brackets forming wall bottom skirtings are intended to satisfy precise objectives, namely the putting into place of the skirting after laying the floor covering, the energizing of electrical apparatuses in the upper part of the skirting, mechanical resistance to transverse stresses, etc. Generally their design permits their construction from drawn metal parts or the extrusion of plastics materials in such a way that their cost is taken into account.

The necessity of combining esthetics and an easy use of the connections under good safety conditions frequently leads to complicated devices, whose robustness does not permit numerous disassemblies for various interventions relating to the connecting of the connections.

This is one of the reasons why the skirtings must have a robust design, so that their putting into place is not considered as definitive, their detachability being one of the fundamental aims. These skirtings or brackets must make it possible to conceal and maintain in position cables and ducts, thus facilitating the restoration of rooms without any action on the foundations.

SUMMARY OF THE INVENTION

The invention specifically relates to a detachable bracket forming a wall bottom skirting for the fixing of electrical and/or fluid connections obviating the aforementioned prior art disadvantages.

According to the invention the bracket is shaped like a vertically positioned, drawn out or stretched Z, whose median flange serves as a support for the connections and is contacted at three points in a cavity made in the lower part of the wall, an abutment point in the upper part of the upper flange of the Z, a support point in the upper part of the lower flange of the Z and a fixing point forming an abutment in the lower part of the lower flange of the Z.

Preferably the upper, median and lower flanges constituting the stretched Z of said bracket have substantially equal dimensions. These flanges can have different thicknesses and in particular the lower flange can be thicker than the two others.

According to a constructional variant the flanges are obtained in the form of two or three separate, dismantlable elements.

Preferably the flanges are made from different materials and in particular the upper and median flanges are made from less rigid materials than the lower flange.

Thus, on the basis of a particular shape of the vertically positioned, stretched Z-shaped bracket and as a function of the use of the latter, namely for electrical or hydraulic connections or for esthetic reasons, it is possible to vary the thicknesses of the flanges, the nature of the materials forming them, so that it is possible to construct the flange from one, two or three parts.

It can e.g. be of interest to have a lower wooden flange and median and upper flanges made from flexible, insulating materials, such as plastics or composites. The two thus formed bracket parts are rigidly fixed to one another. In the same way a one-piece, light metal bracket with its flanges having different thicknesses can be produced in the form of a stretched section.

According to a preferred embodiment the abutment on which is contacted the upper part of the upper flange of the bracket is produced in the upper part of the cavity made in the lower part of the wall limiting the horizontal displacement of the upper flange of said bracket.

Preferably, said abutment in the upper part of the cavity is produced with the aid of a joined element fixed to the wall and able to serve as a decorative pattern.

According to a preferred embodiment the support point on which is articulated the upper part of the lower flange of the Z is produced in the lower part of the cavity also serving as a rotation and sliding point for the lower flange of said bracket during its putting into place or disassembly.

Preferably, the lower part fixing of the lower flange of said bracket takes place in the lower part of the cavity with the aid of means forming an abutment and facilitating assembly and disassembly operations such as clips which are not visible on the front face of said flange.

Thus, the contact points of the detachable bracket located in the upper and lower parts of the cavity made in the lower part of the wall make it possible to keep the bracket in a fixed position. Thus, by pulling or pushing on a connection fixed to the median flange of the cord, the latter remains perfectly stationary. The same articulation points permit an easy disassembly of the bracket so as to give access to the rear of the connections. After removing the fixture in the lower part of the lower flange of the bracket, it is merely necessary to tilt the latter about the support point, whilst sliding it around said point in such a way as to free the upper and lower ends of the bracket.

According to a preferred variant the contact points serving as the abutment, support and fixing points for said bracket are constituted by a section housed in the cavity made in the lower part of the wall and able to serve as a support for the wall, as well as the cables and ducts.

Thus, the construction of a detachable bracket in the form of a stretched Z and perfectly immobilized for the use of different connections is easily dismantlable as a result of its three contact points facilitating access to the rear of the connections.

BRIEF DESCRIPTION OF THE DRAWINGS

Other features and advantages can be gathered from the following description of an embodiment of the detachable bracket according to the invention given in exemplified manner and with reference to the attached drawings, wherein show:

FIG. 1 a diagrammatic sectional view of the lower part of a wall having the detachable bracket according to the invention.

FIG. 2 a diagrammatic sectional view showing the installation or disassembly of the bracket with respect to the cavity made in the lower part of the wall.

DETAILED DESCRIPTION OF PREFERRED EMBODIMENTS

Figure 5:
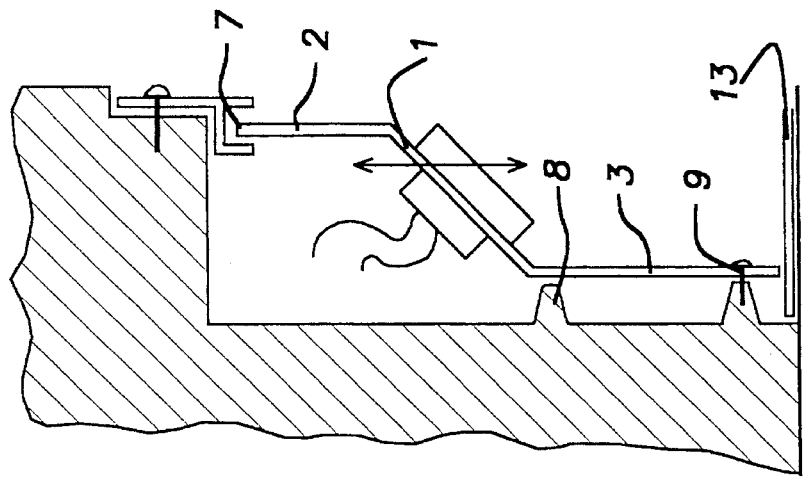
FIG. 5 a diagrammatic sectional view of a variant of the contact point of the upper end of the bracket.

FIG. 1 is a diagrammatic sectional view of the lower part of a wall or a partition which is sufficiently thick to enable the insertion of the bracket according to the invention. Certain significant dimensions will be given for information purposes only.

The bracket is made from light alloy with a thickness of 2 mm and the sheet is bent in order to form a stretched or drawn out Z and the obtuse angles of the flanges form approximately 120°. The flanges 1,2,3 of the bracket have approximately identical dimensions of 80 mm. The usual length of the sheet is 2 m and is cut as required. The bracket is inserted in a cavity made in the lower part of the wall and is approximately 250 mm high and 80 mm deep. The median flange 1 has several cutouts making it possible to receive connections such as plugs, air ventilation connections for centralized ventilation systems, telephone and television connections, etc. These connections are fixed to the flange by all conventional means such as screws, clips and fasteners.

The ends of the bracket are vertically immobilized at the bottom by the floor covering 13 and at the top by the upper, horizontal part of the cavity 5.

In the horizontal direction the bracket is immobilized at the bottom by all conventional means such as the screws 9 shown in FIG. 1 or other means such as clips and fasteners making it possible to fix the bracket to the vertical part of the cavity 5 provided with a boss or reinforcement and at the top by an abutment 7 formed at the end of the upper, horizontal part of the cavity 5. The lower bracket flange 3 is a part fixed at the bottom 9 of the cavity, so that the upper flange 2 bears at the top against the abutment 7, so that the bracket must have a third support point 8 on the vertical part of the cavity 5 level with the upper part of the lower flange 3. This support point 8 constituted by a boss or reinforcement fixed to the vertical wall of the cavity 5 makes it possible to rigidly keep the bracket in place in the cavity and facilitates the assembly and disassembly of said bracket, as shown in FIG. 2, so as to be able to make connections between wires, ducts and the rear of connections fixed to the median flange 1.

Fixed in this way the bracket is able to withstand without difficulty the pressure exerted perpendicular to the median flange 1 during the fitting of a plug in the connection, or the pull exerted on extracting the same.

The cavity 5 must have adequate dimensions to permit the housing of the rear part of the connections, but also the passage of cables and ducts which can be fixed in the upper part of the vertical wall of the cavity 5.

The diagrammatic sectional view of FIG. 2 illustrates the assembly and disassembly of the bracket 1,2,3 in the cavity 5. The bracket 1,2,3 is shown in three positions. In position I, the bracket shown in dotted line form with connections fixed to the median flange 1 (not shown in this drawing) is placed obliquely in the cavity, the upper part of the lower flange 3 bearing on the support point 8. The upper and lower ends of the bracket are flush with the horizontal part of the cavity 5 and the floor covering 13.

In order to pass from position I to position II, it is merely necessary to slide the lower flange 3 whilst raising it bearing on the support point 8, the ends of the bracket still being flush with the horizontal part of the cavity 5 and the floor covering 13.

It is sufficient to continue the tilting and sliding movements on the support point 8 in order to pass from position II to position III. In the latter position, which is that shown in FIG. 1, it is merely necessary to fix the lower flange 3 against the vertical wall of the cavity 5 for the bracket to be immobilized.

Figure 3:
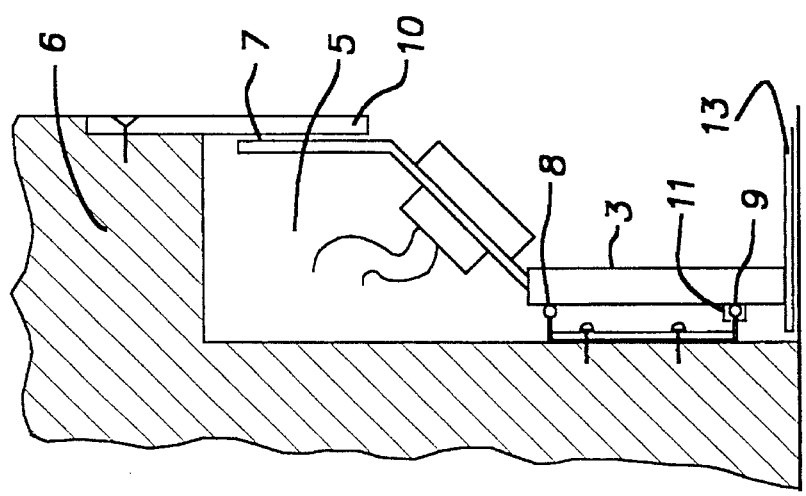
FIG. 3 a diagrammatic sectional view of variants of the bracket according to the invention and its contact points.

FIG. 3 is a diagrammatic sectional view of variants of the bracket and its contact points.

Thus, the lower flange 3 is made from 12 mm thick wood and the median 1 and upper 2 flanges are made from 3 mm thick plastic. The fixing of the flanges 1,2 to the lower flange 3 is obtained by simple wood screws, but fixing by groove and adhesion would also be suitable. Thus, the lower wooden flange 3 can form a decorative skirting, whereas the median 1 and upper 2 flanges are made from a flexible insulating material, permitting an easier assembly and disassembly than in the case of FIG. 1.

Figure 4:
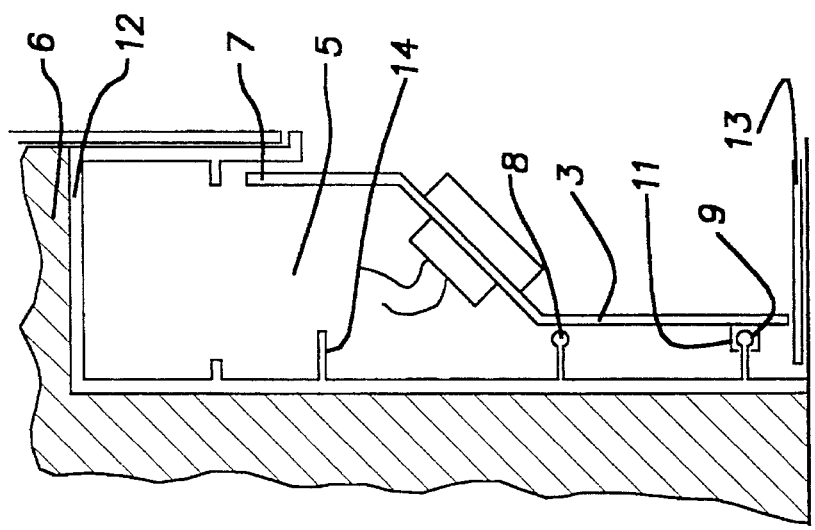
FIG. 4 a diagrammatic sectional view of a variant of the bracket contact points.

With regards to the contact points, the abutment 7 is a simple, opaque plastic plate 10 fixed by screws to the wall 6 on which has been formed a flat. Other fixing types can be suitable for avoiding the presence of aesthetically detrimental screws. The support point 8 and fixing point 9 are obtained on the flange of a light alloy section fixed to the vertical part of the cavity 5 by screws, whilst the bracket is fixed 9 by a clip. These clips are regularly spaced by approximately 400 mm over the lower flange 3. FIG. 4 is a diagrammatic sectional view of a variant of the bracket contact points in accordance with the present invention. This bracket is in accordance with FIG. 3, but could also be in accordance with FIG. 1. A light alloy section forms the three contact points, the abutment point 7, the support point 8 and the fixing point 9. This section is inserted in the cavity 5 and fixed to its walls (fastenings not shown). This section is structured so as to be perfectly rigid and acts as a support for the lower part of the wall, but also for supporting and maintaining with the aid of a rib 14 the cables and ducts located in the upper part of the cavity 5.

This section housed in the cavity could, as a function of the sought aesthetic effect and the intended use of the bracket, be advanced with respect to the wall and would in this case require a smaller housing thickness, which could be advantageous in the case of thin partitions.

FIG. 5 is a diagrammatic sectional view of a variant of the abutment 7 according to the invention. In the construction shown in the previous drawings the abutment only acted in a single direction so as to allow the installation and disassembly of the bracket in accordance with FIG. 2. In FIG. 5 the abutment is duplicated and forms a housing made in a random manner and in particular according to FIGS. 1,3 or 4. In this variant the assembly and disassembly of the bracket cannot take place as described hereinbefore. If the median 1 and upper 2 flanges are sufficiently flexible, it is sufficient to position the upper flange in the abutment and then present the lower flange 3 to the support point 8 and fixing point 9 by acting on the flexibility of the flanges 1 and 2. If the flanges 1 and 2 are rigid, either the reduction in the size of the lower flange 3 will permit the putting into place, or an adaptation of the fastening will facilitate it, e.g. through the formation of an oblong hole.

Thus, the bracket according to the invention permits easy manipulation, is easy to install and easy to disassemble. It is perfectly fixed to the lower part of the wall making it possible to absorb the pressure and traction e.g. exerted during the putting into place and extraction of a plug. Whilst being robust and esthetic, it is also practical as a result of giving access to the rear of the connections. The bracket according to the invention meets the fixed objectives.

What is claimed is:

1. Wall bottom skirting for fixing electrical and/or fluid connections facilitating the incorporation and concealment of cables and ducts, comprising:

a cavity in a lower part of a wall and having an upper part, a median part, and a lower part;

an abutment point at said upper part of said cavity;

a support point at said median part of said cavity;

a fixing point at said lower part of said cavity;

a detachable bracket having a median flange, an upper flange, and a lower flange, said upper, median, and lower flanges forming a shape like a stretched Z, said median flange serving as a support for connections, said upper flange contacting said abutment point, and said lower flange contacting said support point and being fixed to the wall through said fixing point.

2. Wall bottom skirting according to claim 1, wherein said abutment point is formed by a joined element fixed to the wall and able to serve as a decorative pattern.

3. Wall bottom skirting according to claim 1, wherein said support point is a rotation and sliding point for said lower flange of said bracket during assembly and disassembly.

4. Wall bottom skirting according to claim 1, wherein said lower flange has a front face which faces away from the cavity and said lower flange of said bracket is fixed to the wall by means such as clips which are not visible on the front face of said lower flange.

5. Wall bottom skirting according to claim 1, wherein said abutment point, said support point, and said fixing point are formed by a section housed in the cavity.

6. Wall bottom skirting according to claim 5, wherein said section comprises means for supporting cables or ducts.

7. Wall bottom skirting according to claim 1, wherein at least one of said median, upper, and lower flanges has a different thickness.

8. Wall bottom skirting according to claim 7, wherein said lower flange is thicker than said median and upper flanges.

* * * * *